US012610351B2

(12) United States Patent
Schober et al.

(10) Patent No.: US 12,610,351 B2
(45) Date of Patent: Apr. 21, 2026

(54) RESOURCE ALLOCATION IN RADIO COMMUNICATIONS

(71) Applicant: Nordic Semiconductor ASA, Trondheim (NO)

(72) Inventors: Karol Schober, Oulu (FI); Mauri Nissilä, Oulu (FI)

(73) Assignee: Nordic Semiconductor ASA, Trondheim (NO)

( * ) Notice: Subject to any disclaimer, the term of this patent is extended or adjusted under 35 U.S.C. 154(b) by 487 days.

(21) Appl. No.: 18/224,999

(22) Filed: Jul. 21, 2023

(65) Prior Publication Data

US 2024/0057042 A1 Feb. 15, 2024

(30) Foreign Application Priority Data

Aug. 11, 2022 (GB) ..................................... 2211761

(51) Int. Cl.
*H04L 5/00* (2006.01)
*H04W 72/044* (2023.01)

(52) U.S. Cl.
CPC ......... *H04W 72/044* (2013.01); *H04L 5/0007* (2013.01)

(58) Field of Classification Search
CPC .. H04W 72/044; H04L 5/0007; H04L 5/0044; H04L 5/0058
See application file for complete search history.

(56) References Cited

U.S. PATENT DOCUMENTS

2018/0270008 A1* 9/2018 Yi .......................... H04W 76/27
2018/0367185 A1* 12/2018 Yi .......................... H04B 1/7143
(Continued)

FOREIGN PATENT DOCUMENTS

EP          3 761 543 A1    1/2021
WO    WO 2018/122604 A1    7/2018
WO    WO 2019/032653 A1    2/2019

OTHER PUBLICATIONS

3GPP TSG RAN WG1#103-e, R1-2008076 Title: Discussion on required changes to NR using DL/UL NR waveform in 52.6GHz~71Ghz (Year: 2020).*

(Continued)

*Primary Examiner* — Faruk Hamza
*Assistant Examiner* — Abusayeed M Haque
(74) *Attorney, Agent, or Firm* — Klarquist Sparkman, LLP

(57) ABSTRACT

A radio transmitter is configured to operate in accordance with a first predetermined OFDM radio protocol. The transmitter reserves, within a timeslot with a predetermined timeslot duration, a reserved set of time-frequency resource units not available for an OFDM data channel defined by the first protocol. The transmitter allocates, within the timeslot, an allocated set of R time-frequency resource units for the OFDM data channel defined by the first protocol, wherein a number M of time-frequency resource units are included in both the allocated set and the reserved set, wherein the value R is such that $R>N$ and $R-M \leq N$, where N is a predetermined maximum number of time-frequency resource units that can be used to carry the data channel. The transmitter then transmits data indicative of the allocated set of R time-frequency resource units and data indicative of the reserved set of time-frequency resource units.

20 Claims, 4 Drawing Sheets

(56) References Cited

U.S. PATENT DOCUMENTS

| | | | | |
|---|---|---|---|---|
| 2020/0236683 | A1* | 7/2020 | Wieruch | H04W 72/54 |
| 2022/0417911 | A1* | 12/2022 | Kwak | H04L 5/0053 |
| 2023/0199751 | A1* | 6/2023 | Huang | H04W 52/0229 |
| | | | | 370/329 |
| 2023/0388082 | A1* | 11/2023 | Ma | H04L 27/00 |

OTHER PUBLICATIONS

3GPP TSG RAN WG1 Meeting#95, R1-1814309 Title:Summary of Offline Discussion on Triggring Adaption of UE Power Consumption (Year: 2018).*
IPO Combined Search and Examination Report under Section 18(3) for Great Britain Application No. 2211761.8, mailed Jan. 31, 2023, 3 pages.
IPO Search Report under Section 17(5) for Great Britain Application No. 2211761.8, mailed Jan. 23, 2023.
3GPP TS 38.331 V17.0.0 (Mar. 2022) Technical Specification, 3rd Generation Partnership Project; Technical Specification Group Radio Access Network; NR; Radio Resource Control (RRC) protocol specification (Release 17), pp. 174-178.
On-network / On-demand Pre-arranged Group Call / Automatic Commencement Mode / Floor Control / Upgrade to Emergency Group Call / Cancel Emergency State / Upgrade to Imminent Peril Group Call / Cancel Imminent Peril State / Client Terminated (CT); Chapter 6.1.1.2, 3GPP TSG-RAN WG5 Meeting #91-e, R5-213661, May 2021, 22 pages.

* cited by examiner

RESOURCE ALLOCATION IN RADIO COMMUNICATIONS

CROSS-REFERENCE TO RELATED APPLICATION

This application claims priority from Great Britain Application No. 2211761.8, filed Aug. 11, 2022, which application is incorporated by reference in its entirety.

BACKGROUND OF THE INVENTION

The present invention relates to time-frequency resource allocation in radio communications, particularly though not exclusively in relation to the 3GPP Reduced Capability (RedCap) 5G New Radio (NR) radio protocol.

Recent developments in the 3GPP 5G radio communication protocol have introduced a new type of user equipment, named Reduced Capability or RedCap, with reduced complexity (e.g. reduced computational resources, reduced power consumption, reduced bandwidth, reduced number of receive antennas, reduced cost of manufacture, etc.) when compared to standard 5G devices. RedCap devices are particularly well suited for applications such as industrial sensors, as they inherit the low latency of New Radio, but at the same time benefit from reduced cost and complexity. RedCap devices are also particularly well suited for applications requiring up to 50 Mbit/s bit rate, such as video, and are meant to target applications similar to LTE Cat 1 bis, i.e. not Low-power-wide-area (LPWA) applications dominated by NB-IoT and LTE-M modules.

The development of RedCap devices brings with it a number of hurdles which need to be overcome in order to enable those devices to successfully integrate with other devices configured to operate in accordance with other cellular radio protocols such as full 5G and 4G LTE. Particular difficulties arise where other radio access technologies (RATs) share the same frequency spectrum with the RedCap RAT, as these need be worked around in order to maintain functionality of devices that operate in accordance with different RATs. Such other RATs include, for example, LPWA technologies.

More generally, it would be desirable for radio systems that implement an Orthogonal Frequency Division Multiplexing (OFDM) protocol (i.e. RAT) such as RedCap, to make efficient use of computational resources and power consumption, while facilitating coexistence with other radio protocols/RATs and maximising overall data rates between devices.

The present invention aims to address at least some of the issues set out above.

SUMMARY OF THE INVENTION

When viewed from a first aspect, the invention provides an OFDM radio communication system comprising a radio transmitter and a radio receiver, the transmitter and receiver being configured to operate in accordance with a first predetermined OFDM radio protocol, wherein:

the receiver is configured, within a timeslot with a predetermined timeslot duration, to receive and process up to a predetermined maximum number N of time-frequency resource units carrying an OFDM data channel defined by the first protocol; and the transmitter is configured to:

reserve, within the timeslot, a reserved set of time-frequency resource units not available for the data channel;

allocate, within the timeslot, an allocated set of R time-frequency resource units for the data channel, wherein a number M of time-frequency resource units are included in both the allocated set and the reserved set, and wherein the value R is such that $R > N$ and $R - M \leq N$; and transmit, to the receiver, data indicative of the allocated set of R time-frequency resource units and data indicative of the reserved set of time-frequency resource units.

Thus it will be seen that embodiments provide an optimised radio communication system, comprising a receiver with constrained processing capabilities, that enables the number of resource units allocated to an OFDM data channel (for data transmission to the receiver) to be higher than the receiver's processing limit of N resource units, by taking into account resources that the system is required to reserve time-frequency resource units for—e.g. legacy signals and/or channels—whilst remaining compliant with the processing capabilities of the receiver by keeping the number of resource units that carry the data channel within a timeslot less than or equal to the maximum number, N, that such a receiver can receive and process within the timeslot. This may advantageously enable the overall data transfer rate between the transmitter and the receiver, which is dependent on the number of resource units used to transmit the data channel in each timeslot, to be higher than would otherwise be possible.

In a set of embodiments, the reserved set of time-frequency resource units not available for the data channel comprises a reserved set of time-frequency resource units suitable for one or more OFDM signals or channels other than the data channel (which may be signals or channels of the first radio protocol or signals or channels of a different radio protocol or RAT).

In some embodiments, the reserved set may contain all the time-frequency resource units that are not available for the data channel in the timeslot, while in other embodiments there may be one or more further time-frequency resource units that are not available for the data channel but that are not included in the reserved set for the purposes of the allocation (e.g. resources of a control signal such as a PDCCH).

In a set of embodiments, the transmitter is further configured to transmit data to the receiver over the data channel, within the timeslot, over at least a temporal portion of each of the time-frequency resource units that are included in the allocated set and not included in the reserved set. The data may be transmitted over an entire duration of each of said time-frequency resource units. The data channel may be used, within the timeslot, for transmitting data only to the receiver (i.e. to no other receivers), though in some embodiments the time-frequency resource units included in the allocated set may also be used to transmit data to one or more further receivers, depending on the capabilities of the transmitter.

In a set of embodiments, the transmitter and the receiver each comprise a respective radio transceiver. Hence, the transmitter may also be capable of receiving data and the receiver may also be capable of transmitting data, respectively. The transmitter may comprise a base station radio transmitter or transceiver, and the receiver may comprise a user equipment radio receiver or transceiver.

The predetermined maximum number N may be defined by the first OFDM radio protocol. It may correspond to one or more physical limitations of the receiver (e.g. a memory or processing constraint), although this is not essential. The first predetermined OFDM radio protocol may be or may use a predetermined OFDM radio access technology (RAT). The first OFDM protocol may be any current or future version of the 3GPP Reduced Capability (RedCap) 5G New Radio (NR) radio protocol.

In some embodiments, M could be zero in some timeslots, but for at least one timeslot M is greater than zero.

In some embodiments and/or some situations, where $M>0$, the transmitter may be configured to allocate, within the timeslot, R time-frequency resource units wherein $R=N+M$. In this way, R satisfies $R>N$ and $R-M≤N$, while also being able to send the maximum, or near to the maximum, amount of data to the receiver that the receiver is capable of receiving and processing. This may result in a particularly efficient communication in some situations. The value of R may be a maximum value that satisfies $R>N$ and $R-M≤N$.

The timeslot may be defined by the first protocol, and the predetermined timeslot duration (e.g. 500 milliseconds) may be defined by the first protocol. The timeslot may be one of a succession of discrete, non-overlapping timeslots defined by the first protocol, each with a respective duration that is equal to the predetermined timeslot duration. The or each timeslot may contain a predetermined number of OFDM symbols or symbol periods—e.g. fourteen symbols—which may each have a same predetermined duration defined by the first protocol. The transmitter may be configured to allocate, to the data channel, time-frequency resource units with durations that span all symbols (e.g. all fourteen symbols), or less, within the or each timeslot.

The maximum number N of time-frequency resource units that the receiver can receive and process may apply to each and every timeslot defined by the first protocol (i.e. not just one particular timeslot). Thus, in a set of embodiments, the receiver is configured, within any timeslot defined by the first protocol, with the predetermined timeslot duration, to receive and process up to the predetermined maximum number N of time-frequency resource units carrying an OFDM data channel defined by the first protocol. The transmitter may be configured to allocate, within a timeslot defined by the first protocol, an allocated set of R time-frequency resource units for a data channel defined by the first protocol and intended for data transmission to the receiver.

In a set of embodiments, the one or more signals or channels other than the data channel comprise one or more signals or channels defined by a second predetermined OFDM radio protocol, different from the first radio protocol. The second predetermined OFDM radio protocol may be or may use a second radio access technology (RAT), which may be different from a first RAT of the first radio protocol. The second protocol may be a Long Term Evolution (LTE) protocol, a 4G protocol, a 3G protocol, or any other protocol that may utilise frequency bands that overlap with those used by the transmitter and receiver devices operating in accordance with the first protocol. These signals or channels may be intended for transmission to one or more receivers configured to operate in accordance with the second protocol, which may be different from the aforesaid receiver. The one or more channels may comprise control channels, or synchronisation signals, or data channels, etc. defined by the second protocol. The transmitter (e.g. a cellular base station) may be further configured to operate in accordance with the second OFDM radio protocol.

In other embodiments, the one or more signals or channels other than the data channel may comprise one or more other signals or channels defined by the first protocol—e.g. a control channel, a synchronisation signal, etc.—which may be intended for transmission to the receiver within the timeslot and/or intended for transmission to another receiver configured to operate in accordance with the first OFDM radio protocol within the timeslot.

In a set of embodiments, the receiver is configured to:
receive the data indicative of the allocated set and the data indicative of the reserved set; and
use said received data to determine which of the time-frequency resource units included in the allocated set are also included in the reserved set. This process may be referred to herein as rate-matching. This determination may enable the receiver to determine which time-frequency resource units carry the data channel, and thereby receive data over the data channel.

In a set of embodiments, the receiver is configured, in dependence on a determination of which of the time-frequency resource units included in the allocated set are also included in the reserved set, to calculate the number M of time-frequency resource units included in both the allocated set and the reserved set. It may store the value M in a memory of the receiver. The receiver may be configured to determine whether $R-M≤N$. It may be configured to determine whether to receive and process data transmitted to the receiver over the data channel within the timeslot in dependence on whether $R-M≤N$. It may be configured to drop data transmitted over the data channel within the timeslot if $R-M>N$. It may be configured to signal an error to the transmitter if $R-M>N$, e.g. by sending a negative acknowledgement (NACK).

Although an error should not be possible when the transmitter is functioning as disclosed herein, this check may advantageously enable the receiver to ensure it will be able to receive the data channel transmitted by a transmitter or the transmitter (e.g. which may be in faulty or noncompliant state) and, if not, respond accordingly before it begins processing the data channel, thereby saving computational resources and reducing overall power consumption for the receiver.

When the receiver determines that $R-M≤N$ for a timeslot, the receiver may be configured to receive the data channel within the timeslot. When the receiver determines that $R-M>N$ for a timeslot, the receiver may be configured to drop the data channel within the timeslot.

In a set of embodiments, the receiver is configured to calculate the number M of time-frequency resource units included in both the allocated set and the reserved set by determining the number of time-frequency resource units for which the receiver would not need to perform channel estimation and/or demodulation and/or de-mapping and/or channel-code-rate-matching after determining which of the time-frequency resource units included in the allocated set are also included in the reserved set.

In a set of embodiments, each time-frequency resource unit occupies, in frequency, a respective one of a plurality of non-overlapping frequency ranges. In some embodiments, but not all embodiments, each time-frequency resource unit occupies a unique frequency range. The frequency ranges may all be of equal size. Each frequency range may comprise a respective set of one or more consecutive or nonconsecutive frequency subcarriers. In some embodiments, each frequency range spans a respective set of twelve consecutive frequency subcarriers. Each frequency range may be a different respective 5G NR resource block (RB or PRB), or a respective physical resource group (PRG) spanning multiple RBs within a given timeslot.

In a set of embodiments, the timeslot comprises a plurality of non-overlapping time ranges (e.g. each range spanning one or multiple OFDM symbol periods), and each time-frequency resource unit occupies, in time, a respective one of the plurality of time ranges. In some embodiments, two or more time-frequency resource units may occupy a same time range, but with different frequency ranges. The time ranges may all be of equal duration.

The first protocol may specify that each timeslot has a duration of a predetermined number of OFDM symbols—e.g. fourteen symbols. However, the transmitter may be configured to allocate the data channel to time-frequency resource units with durations of fewer symbol periods than included in a timeslot—e.g. fewer than fourteen symbol periods.

In a first set of embodiments, each time-frequency resource unit has a duration equal to one OFDM symbol period defined by the first protocol. In such embodiments, each time-frequency resource unit may span, and align with, a respective symbol of the timeslot. Each time-frequency resource unit may be a different respective 5G NR resource element (RE).

In a second set of embodiments, each time-frequency resource unit has a duration equal to a plurality—e.g. two, three, etc.—of symbol periods, but less than the duration of the whole timeslot, and each time-frequency resource unit may span, and align with, said plurality of symbol periods, which may be consecutive symbol periods in time.

In such first or second set embodiments, the transmitter may be configured to transmit the data channel over the entire respective duration of each of the time-frequency resource units.

Thus, in such embodiments, the allocation for the data channel within the timeslot may be performed at the level of individual OFDM symbols or groups of OFDM symbols (or at a fraction of the predetermined timeslot duration). This may advantageously help optimise the overall usage of the time-frequency spectrum by keeping the proportion of said spectrum that is not used by the transmitter to transmit data in one form or another to a minimum, thus increasing the overall data rate that may be obtained between the transmitter and the receiver (as well as between the transmitter and other receivers and/or between other transmitters and other receivers that use the same range of frequencies).

However, in a third set of embodiments, each time-frequency resource unit has a duration equal to the predetermined timeslot duration. In such embodiments, each time-frequency resource unit may span, and align with, the timeslot. Each time-frequency resource units may be a respective 5G NR resource block (RB) within the timeslot.

Thus, in such embodiments, the processing limitation and/or allocation for the data channel within the timeslot may be imposed and/or performed at a slot-wide level—i.e. essentially being a purely frequency-based allocation. Thus, if a given frequency range is not available for the data channel at any time within the timeslot, then that frequency range may be reserved to the reserved set for the entire duration of the timeslot. Alternatively, a frequency range may be reserved to the reserved set only if all allocated symbols within the timeslot for that frequency range are not available for the data channel. It will thus be seen that, in such embodiments, the timeslot may typically be divided into fewer time-frequency resource units than in implementations where each time-frequency resource unit has a duration equal to a fraction of a timeslot (e.g. the duration of a symbol).

In such third set embodiments, the transmitter may be configured, for at least one of the time-frequency resource units included in the allocated set and not included in the reserved set, to transmit the data channel, within the timeslot, over only a portion of the duration of the respective time-frequency resource unit, the portion being less than the full duration of the time-frequency resource unit (i.e. not the whole timeslot, for example not over all fourteen symbols of a 5G NR slot).

Such embodiments may advantageously place less computational burden on the receiver when determining which of the time-frequency resource units included in the allocated set are also included in the reserved set (i.e. when performing rate-matching), as the timeslot is divided into fewer overall time-frequency resource units. This may be particularly advantageous where the receiver is a battery-powered device and/or a reduced capability (RedCap) device with limited processing power, as this may further reduce power consumption and/or keep processing requirements for such a device low (thereby reducing its bill-of-materials). Similarly, such embodiments may also advantageously place less computational burden on the transmitter when allocating time-frequency resource units, though this is generally less of a concern.

In such first, second, or third sets of embodiments, the value of R may be determined as a maximum value that is divisible by the predetermined timeslot duration, measured in time-frequency resource unit durations, and that satisfies $R>N$ and $R-M \leq N$. In the first set of embodiments, the predetermined timeslot duration, measured in time-frequency resource unit durations, may be equal to the total number of symbols included in the timeslot—e.g. fourteen. Thus, in some embodiments, the value of R may be calculated as the maximum value that is divisible by the total number of symbols included in the timeslot (e.g. fourteen), and that satisfies $R>N$ and $R-M \leq N$. Alternatively, in the third set of embodiments, the predetermined timeslot duration, measured in time-frequency resource unit durations, may be equal to one (as, in such embodiments, each time-frequency resource unit has a respective duration that is equal to the predetermined timeslot duration), such that the divisibility condition is trivially met by any value of R.

When viewed from a second aspect, the invention provides a radio receiver configured to operate in accordance with a first predetermined OFDM radio protocol, the radio receiver being configured:

within a timeslot with a predetermined timeslot duration, to receive and process up to a predetermined maximum number N of time-frequency resource units carrying an OFDM data channel defined by the first protocol;

to receive data indicative of an allocated set of R time-frequency resource units for said data channel;

to receive data indicative of a reserved set of time-frequency resource units not available for said data channel; and to use said received data to determine which of the time-frequency resource units included in the allocated set are also included in the reserved set.

Any of the optional features of the radio receiver set out above may be features of embodiments of this aspect also.

In particular, in a set of embodiments, the receiver is configured, within any timeslot defined by the first protocol, with the predetermined timeslot duration, to receive and process up to the predetermined maximum number N of time-frequency resource units carrying an OFDM data channel defined by the protocol.

In a set of embodiments, the receiver is further configured, in dependence on said determination, to calculate the number M of time-frequency resource units included in both the allocated set and the reserved set and to determine whether $R-M \leq N$ It may be configured to determine, based on the outcome of this determination, whether to receive and process data in the data channel within the timeslot.

The data channel may be carried, within the timeslot, over the time-frequency resource units that are included in the allocated set and not included in the reserved set, for at least a portion of the duration of each of said time-frequency resource units.

The receiver may comprise a transceiver, and may thus be capable of transmitting radio signals as well as receiving them. The receiver may comprise a user equipment radio receiver or transceiver. The receiver may be configured to operate in accordance with a version of the Reduced Capability (RedCap) 5G New Radio (NR) radio protocol.

When viewed from a third aspect, the invention provides a radio transmitter configured to operate in accordance with a first predetermined OFDM radio protocol, the radio transmitter being configured to:

reserve, within a timeslot with a predetermined timeslot duration, a reserved set of time-frequency resource units not available for an OFDM data channel defined by the first protocol;

allocate, within the timeslot, an allocated set of R time-frequency resource units for the OFDM data channel defined by the first protocol, wherein a number M of time-frequency resource units are included in both the allocated set and the reserved set, and wherein the value R is such that $R>N$ and $R-M \leq N$, where N is a predetermined maximum number of time-frequency resource units that can be used to carry the data channel within the timeslot; and transmit data indicative of the allocated set of R time-frequency resource units and data indicative of the reserved set of time-frequency resource units.

The maximum number N of time-frequency resource units may be defined by the first protocol.

Any of the optional features of the radio transmitter set out above may be features of embodiments of this aspect also.

In particular, in a set of embodiments, the transmitter is further configured to transmit the data channel, within the timeslot, over the time-frequency resource units that are included in the allocated set and not included in the reserved set, for at least a temporal portion of each of said time-frequency resource units.

A further aspect of the disclosure provides a method of operating a radio communication system, the system comprising a radio transmitter or a radio receiver or both, the method comprising performing any appropriate combination of steps disclosed herein. Another aspect provides computer software, and a non-transitory storage medium bearing the same, comprising instructions which when executed on a processing system of a radio transmitter or a radio receiver cause the transmitter or receiver to carry out any appropriate combination of steps disclosed herein.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
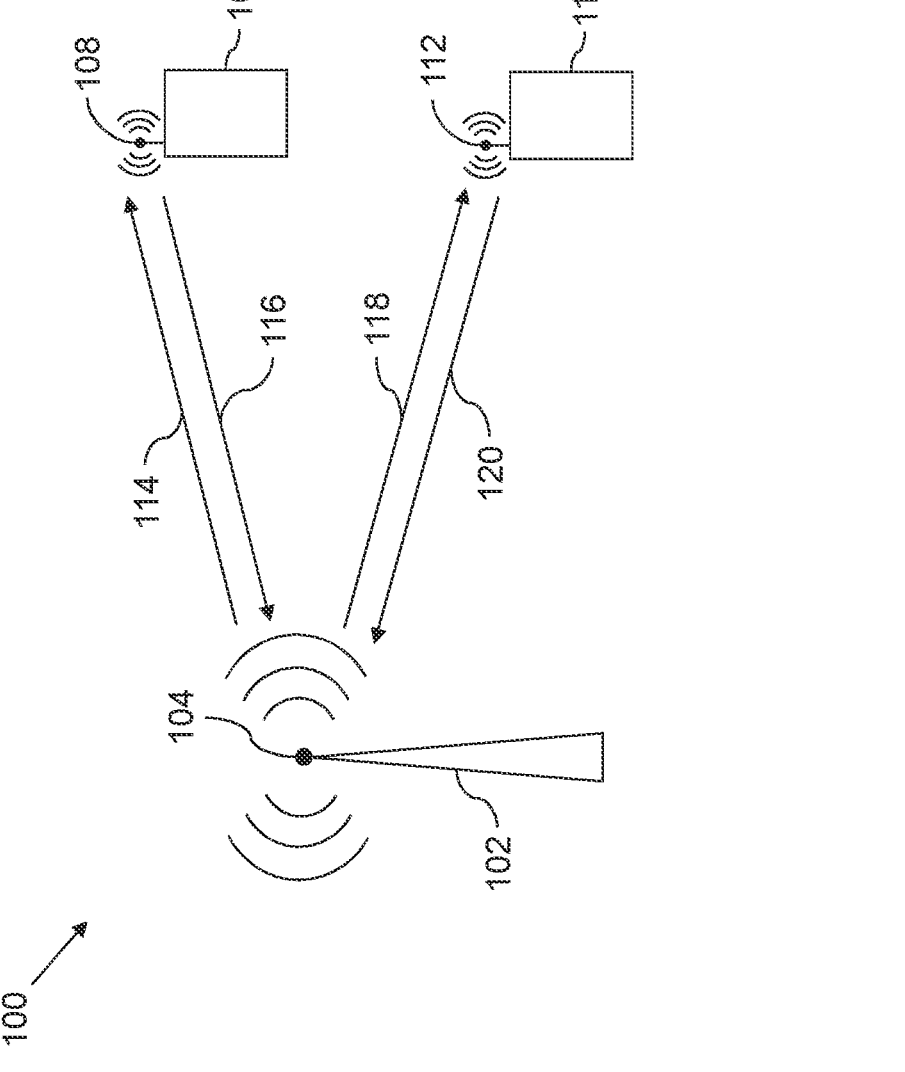
FIG. 1 is a schematic diagram of a radio communication system in accordance with an embodiment of the invention.

FIG. 1 shows a schematic diagram of an exemplary digital radio communications network 100, which may also be referred to herein as a radio communications system 100. The network 100 includes a base station radio transceiver 102, a first user equipment (UE) radio transceiver 106, and a second UE radio transceiver 110. The base station 102, first UE 106 and second UE 110 each comprise a respective antenna 104, 108, 112 for transmission and receipt of wireless radio signals.

The base station 102 is in wireless radio communication with each UE 106, 110, and can thus transmit wireless signals to, and receive wireless signals from, each UE 106, 110. The first UE 106 is configured to operate in accordance with a first predetermined Orthogonal Frequency Division Multiplexing (OFDM) radio communication protocol—which in this particular embodiment is the RedCap 5G NR radio protocol. The second UE 110 is configured to operate in accordance with a second predetermined OFDM radio communication protocol—which in this particular embodiment is the 4G Long-Term Evolution (LTE) protocol. The base station 102 is configured to operate in accordance with both this first and second protocol, and is thus able to communicate with both UEs 106, 110.

While specific examples of radio protocols have been provided above, it will be appreciated that the principles outlined herein are not limited to these protocols and may be equally applied to other protocols e.g. 802.11 Wi-Fi protocols, etc.

FIG. 1 also shows respective first and second downlink signal paths 114, 118 from the base station 102 when it is acting as a transmitter through its antenna 104 to the first and second UEs 106, 110, respectively, when they are acting as receivers through their respective antennas 108, 112. Similarly, FIG. 1 shows respective first and second uplink signal paths 116, 120 from the first and second UEs 106, 110, respectively, when they are acting as transmitters through their respective antennas 108, 112, to the base station 102 when it is acting as a receiver through its antenna 104.

While the base station 102 and the UEs 106, 110 are described as transceivers in this particular embodiment, it will be appreciated that there may be embodiments where the base station 102 is purely a transmitter (i.e. only capable of transmitting radio signals), and/or the UEs 106, 110 are purely receivers (i.e. only capable of receiving radio signals).

Though only one respective antenna is shown for the base station 102 and the UEs 106, 110, it will be appreciated that these may each comprise any number of antennas in order to enable various communication modes e.g. spatial multiplexing, multiple-input-multiple-output (MIMO), single-input-multiple-output (SIMO), etc. However, in this particular embodiment, the first UE 106 comprises a low-complexity, reduced capability (RedCap) device which typically, but not always, has a single antenna, as shown in FIG. 1. RedCap devices are typically battery-powered devices with relatively low processing capabilities (e.g. sensors) for applications like internet of things (IoT).

It will also be appreciated that the base station 102 and the UEs 106, 110 may include additional electronic components that are not shown in FIG. 1, including but not limited to radio transmission/reception circuitry, amplifiers, filters, analogue-to-digital converters (ADCs), digital-to-analogue converters (DACs), processors, memory, storage, etc. Furthermore, the network 100 is not limited to a single base station 102 and two UEs 106, 110 as shown in FIG. 1—the network 100 may comprise any number of base stations and UEs.

It will be appreciated that the base station 102 is able to transmit different signals and/or channels defined by the first and second protocols at different times and, as it is an OFDM transceiver, over different frequencies at the same time. Thus, the allocation of different signals and/or channels by the base station 102 is effectively performed in a two-dimensional space with one dimension representing the time domain and the other dimension representing the frequency domain. The base station 102 divides this time-frequency space into units, herein referred to as time-frequency resource units, and allocates these time-frequency resource units to different signals and/or channels defined by the first and second protocols.

In particular, the base station 102 needs to ensure that no time-frequency resource units are used to transmit multiple different signals and/or channels defined by the two protocols, as this can cause a number of undesirable effects including interference and data corruption.

The first UE 106, being a RedCap device, has limited processing power. As such, the first UE 106 has an upper limit on the number of time-frequency resource units carrying the data channel defined by the first protocol that it can receive and process within a given time period (e.g. within one 5G NR slot). This can sometimes be referred to as bandwidth, which is usually expressed in Hz. In this example, the first UE 106 has a bandwidth of 5 MHz, though the principles outlined herein are not limited as such.

The two protocols used by the base station 102 may, in some situations, share at least some of the same frequency spectrum. Thus, the base station 102 needs to consider both protocols when allocating time-frequency resource units to the different signals and/or channels defined by the protocols. Examples of downlink signals and channels defined by the first protocol (RedCap 5G NR) include, but are not limited to: reference signals (e.g. DMRS, PTRS, SRS, CSI-RS), synchronisation signals (SSB), control channels (e.g. PDCCH, CORESET) and data channels (e.g. PDSCH). Similarly, the second protocol (4G LTE) also defines reference signals, synchronisation signals control channels and data channels. Both protocols also define symbol durations, timeslot durations, etc., as is known in the art per se.

In this example, the first UE 106 is only capable of receiving and processing up to N time-frequency resource units carrying a data channel defined by the first protocol within a single timeslot with a timeslot duration defined by the first protocol. The actual value N may be any value depending on the device and/or protocol.

Figure 2:
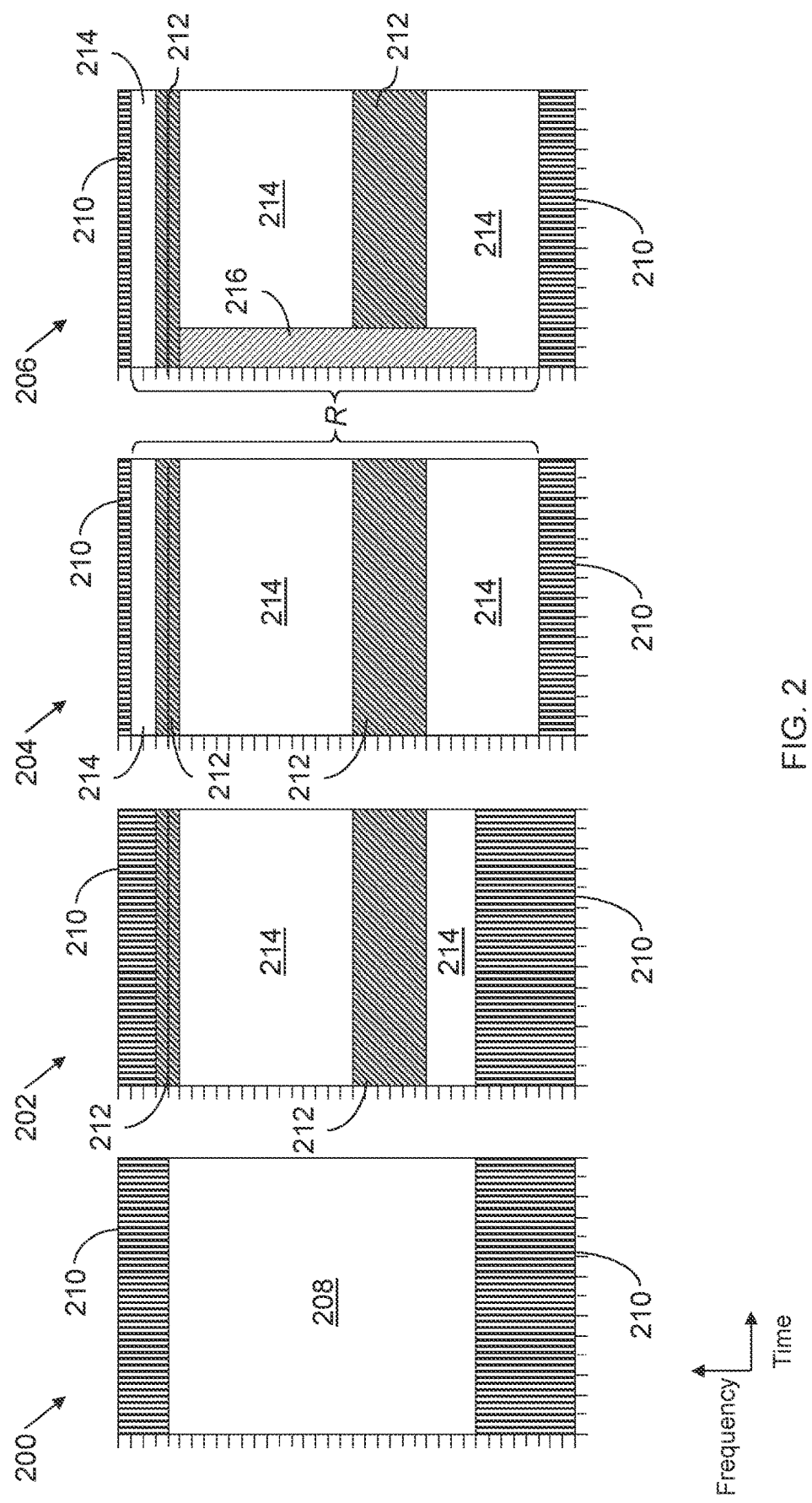
FIG. 2 shows four time-frequency space allocation diagrams illustrative of operations performed by a transmitter in accordance with an embodiment the present invention.
Figure 3:
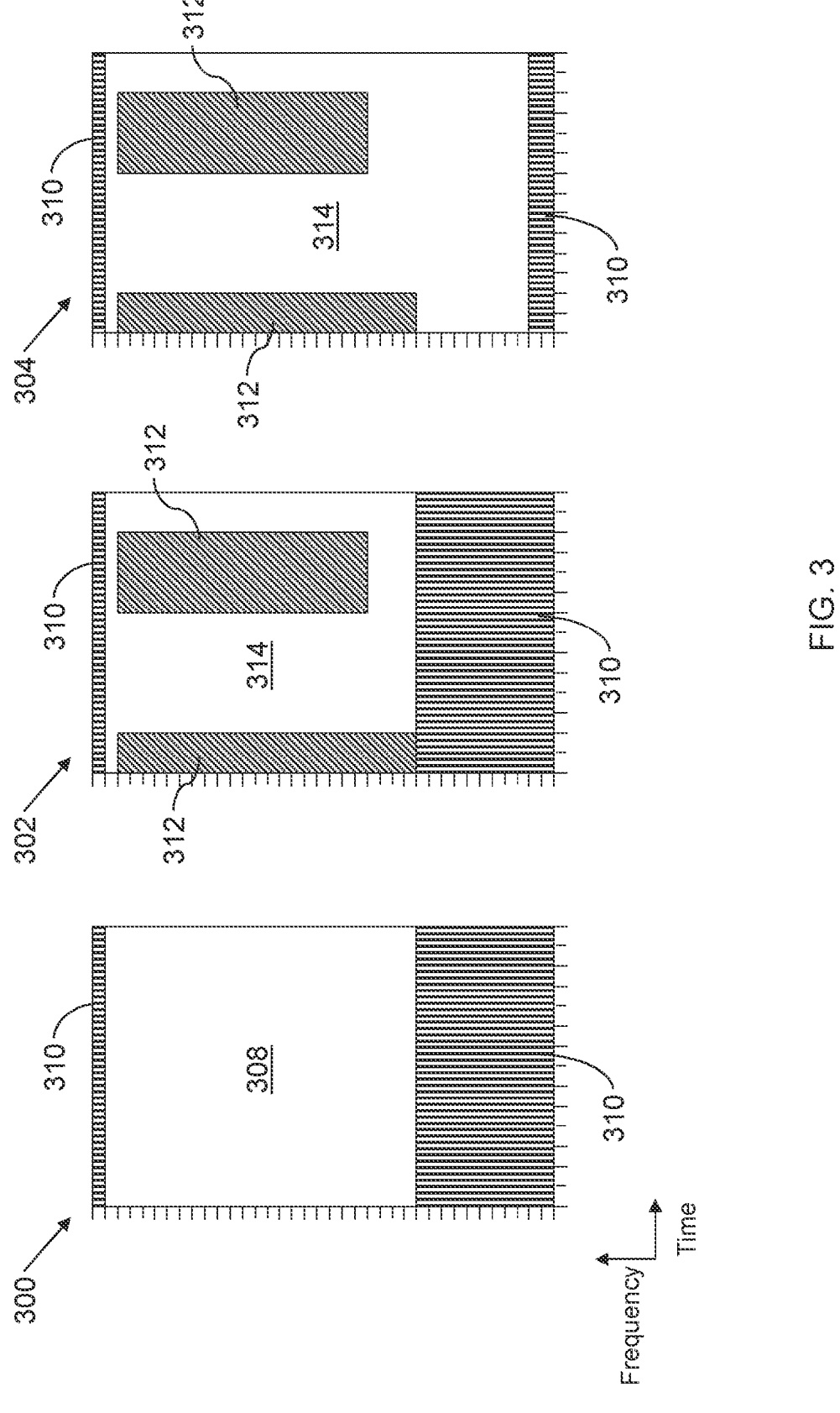
FIG. 3 shows three time-frequency space allocation diagrams illustrative of operations performed by a transmitter in accordance with another embodiment the present invention.

FIGS. 2 and 3 show various allocation diagrams 200, 202, 204, 206, 300, 302, 304 representing a portion of the time-frequency allocation space (i.e. resource grid) for different signals and/or channels defined by the two protocols, at different stages during the allocation process. The allocation process has here been broken down into a sequence of discrete steps for ease of understanding. However, it should be appreciated that the network 100 need not necessarily implement these steps in precisely this way when generating the data for transmission by the base station 102.

The allocation diagrams 200, 202, 204 and 206 of FIG. 2 show different stages of a time-frequency resource unit allocation process according to one embodiment, and the allocation diagrams 300, 302 and 304 of FIG. 3 show different stages of a time-frequency resource allocation process according to another embodiment. The vertical axis of each allocation diagram shows the frequency domain, and the horizontal axis shows the time domain. The vertical axis (frequency domain) is divided into non-overlapping frequency ranges (e.g. groups of twelve subcarriers corresponding to individual RedCap resource blocks), and the time domain is divided into non-overlapping time ranges (e.g. individual OFDM symbols). The allocation diagrams in FIGS. 2 and 3 show only a portion of the entire frequency spectrum available to the base station 102, and only a single timeslot with a predetermined timeslot duration defined by the first protocol (e.g. one fourteen-symbol RedCap slot).

Depending on implementation, any given area of the time-frequency allocation spaces shown in the diagrams 200, 202, 204, 206, 300, 302, 304 may be considered as a time-frequency resource unit that the base station 102 can use to allocate for different signals and/or channels. However, two exemplary sizes of resource unit will be described in detail below: i) time-frequency resource units that occupy one resource-block (RB) for one timeslot; and ii) time-frequency resource units that occupy one resource-block (RB) for one symbol period.

In the example of FIG. 2, each time-frequency resource unit comprises a single division in the frequency domain (which may comprise multiple consecutive frequency subcarriers) with a duration spanning the entire timeslot duration (i.e. the entire width of the allocation diagrams 200, 202, 204, 206). Such time-frequency resource units may be referred to in the RedCap 5G NR standard, and possibly other standards, as respective resource blocks (RB) within a given timeslot. Such time-frequency resource units may, in some embodiments, be respective physical resource groups (PRGs) which span multiple RBs within a given timeslot (and therefore occupy larger respective frequency ranges).

In the first diagram 200 shows an allocated set 208 of R time-frequency resource units for the RedCap data channel and a notional unallocated set 210 of time-frequency resource units which are yet to be allocated to any signal and/or channel. In this example the first UE 106 is only capable of receiving and processing up to twenty-five time-frequency resource units carrying the RedCap data channel within one timeslot—i.e. N=25. Thus, in this diagram 200, twenty-five time-frequency resource units have been shown in the allocated set 208, as representing a notional default starting allocation.

The base station 102 also reserves a reserved set 212 of time-frequency resource units, as shown in the second allocation diagram 202. The time-frequency resource units in the reserved set 212 may be reserved for any signal and/or channel defined by the first or second protocol, or any other suitable protocol, other than the data channel defined by the first protocol (i.e. the RedCap data channel). The reserved set 212 of time-frequency resource units includes eight time-frequency resource units (comprising one group of two adjacent RBs and a further group of six consecutive RBs), as shown in the second allocation diagram 202. However, this is just an example, and the reserved set 212 may include further time-frequency resource units not shown in the second diagram 202. It can be seen from the second allocation diagram 202 that, in this example, the number M of time-frequency resource units included in both the allocated set 208 and the reserved set 212 is equal to seven (one RB from the first group and all six RBs of the second group)—i.e. M=7.

Thus, only eighteen of the twenty-five time-frequency resource units included in the notional initial allocated set 208 can actually be used to transmit the RedCap data channel. This is shown by the usable allocated set 214 in the second diagram 202. This is an undesirable outcome, as this means that the full processing capacity of the first UE 106 would not be fully utilised within the timeslot.

In a naïve approach, the allocation process might stop here, with only eighteen resource blocks being used for the data channel. However, embodiments disclosed herein can expand the allocation so as to provide improved efficiency, as described below.

The base station 102 instead determines a value of R that meets the criteria of R>N, and R−M≤N.

Thus, as shown in the third allocation diagram 204, the base station 102 sets the number R of time-frequency resource units included in the allocated set to thirty-three (R=33), by allocating time-frequency resource units included in the notional unallocated set 210 to the allocated set. Here it can be seen that all eight time-frequency resource units included in the reserved set 212 are also included in the larger allocated set, and thus M is now equal to eight (M=8). It can be therefore seen that this increased value of R now meets the criteria of R>N (as 33>25) and R−M≤N (as 33-8=25). Thus, the useable allocated set 214 now includes twenty-five (i.e. R−M) time-frequency resource units, as shown in the third allocation diagram 204.

The fourth diagram 206 illustrates how the base station 102 also allocates a portion 216 of the time-frequency space to a control channel (e.g. PDCCH) defined by the first or second protocol. This portion 216 is therefore not available for transmission of the data channel. However, as this does not occupy the entire duration of the timeslot (i.e. an entire time-frequency resource), and therefore does not overlap with all symbols of the allocated set of time-frequency resource units, it is not included in the calculation of M and therefore does not affect the number R of time-frequency resource units included in the allocated set. Instead, the allocated set remains the same, but the base station 102 proceeds to transmit the RedCap data channel only over respective portions of durations of the time-frequency resource units included in the useable allocated set 214 that are not occupied by the control channel. Since this results in less data being sent over the data channel than if the full timeslot duration were used for those RBs, it does not risk exceeding the UE 106's data-channel processing limitations.

Before transmitting the RedCap data channel, the base station 102 transmits downlink control information, e.g.

within a control channel PDCCH, to the first UE 106 indicative the allocated set of R time-frequency resource units with the value of R=33, in accordance with the fourth allocation diagram 206, as well as data indicative of the reserved set 212 of time-frequency resource units and, possibly, data indicative of the portion 216.

In the example of FIG. 3, each time-frequency resource unit is not the whole timeslot wide, but instead has a duration spanning a single OFDM symbol period (i.e. one fourteenth of the timeslot duration represented by the width of the diagrams 300, 302, 304), and occupies one resource block—i.e. a single division—in the frequency domain.

As with the example shown in FIG. 2, the first diagram 300 in the example of FIG. 3 shows a notional allocated set 308 of R time-frequency resource units for the RedCap data channel and a notional unallocated set 310 of time-frequency resource units, which is similar to the notional unallocated set 210 shown in FIG. 2.

In this example, the UE 106 is only capable of receiving and processing up to three-hundred-and-fifty time-frequency resource units carrying the RedCap data channel within one timeslot—i.e. N=350. Thus, in this example, three-hundred-and-fifty time-frequency resource units are shown in the allocated set 308, to represent a notional default starting allocation.

The base station 102 also reserves a reserved set 312 of time-frequency resource units, as shown in the second allocation diagram 302. Like in FIG. 2, the time-frequency resource units in the reserved set 312 may be reserved for any signal and/or channel defined by the first or second protocol, or any other suitable protocol, other than the data channel defined by the first protocol (i.e. the RedCap data channel). The reserved set 312 includes one-hundred-and-twenty-eight time-frequency resource units (comprising one group of forty-eight resource units, which in this example may contain a PDCCH control channel, and a further group of eighty resource units), as shown in the second allocation diagram 302. However, this is just an example, and the reserved set 312 may include further units not shown in the second diagram 302. It can be seen that, in this example, the number M of time-frequency resource units included in both the allocated set 308 and the reserved set 312 is equal to one-hundred-and-twenty-eight (i.e. the whole of the reserved set 312).

Thus, only two-hundred-and-twenty-two of the three-hundred-and-fifty time-frequency resource units included in the notional initial allocated set 308 can actually be used to transmit the RedCap data channel. This is shown by the useable allocated set 314 in the second diagram 302. Again, this means that the full processing capacity of the first UE 106 would not be fully utilised.

Instead, however, the base station 102 selects a value of R that meets the criteria of R>N, and R−M≤N and in this example, the base station 102 is configured to calculate R by determining the value R=N+(floor(M/14)*14) by including some of the time-frequency resource units of the notional unallocated set 310 in the allocated set. This gives an R value equal to four-hundred-and-seventy-six (R=476), as shown in the third allocation diagram 304. It can therefore be seen that this increased value of R now meets the criteria of R>N (as 476>350) and R−M≤N (as 476−128<350). Thus, the usable allocated set 314 now includes three-hundred-and-forty-eight (i.e. R−M) time-frequency resource units, as shown in the third allocation diagram 304.

By selecting a value of R which is greater than the number N of time-frequency resource units included in the notional initial allocated set 308 by (floor(M/14)*14) in this manner, the base station effectively allocates the maximum number R of time-frequency resource units to the data channel that is divisible by the number of symbols included in the timeslot (so as not to allocate only part, in time, of a given frequency range) and that meets the criteria of R>N and R−M≤N. This expression may be generalised to R=N+(floor (M/X)*X) for a timeslot consisting of X symbols.

Like in the example shown in FIG. 2, the base station 102 transmits downlink control information indicative of the allocated set and the reserved set 312 to the first UE 106, before transmitting the RedCap data channel over the usable allocated set of time-frequency resource units 314 shown in the third allocation diagram 304.

Figure 4:
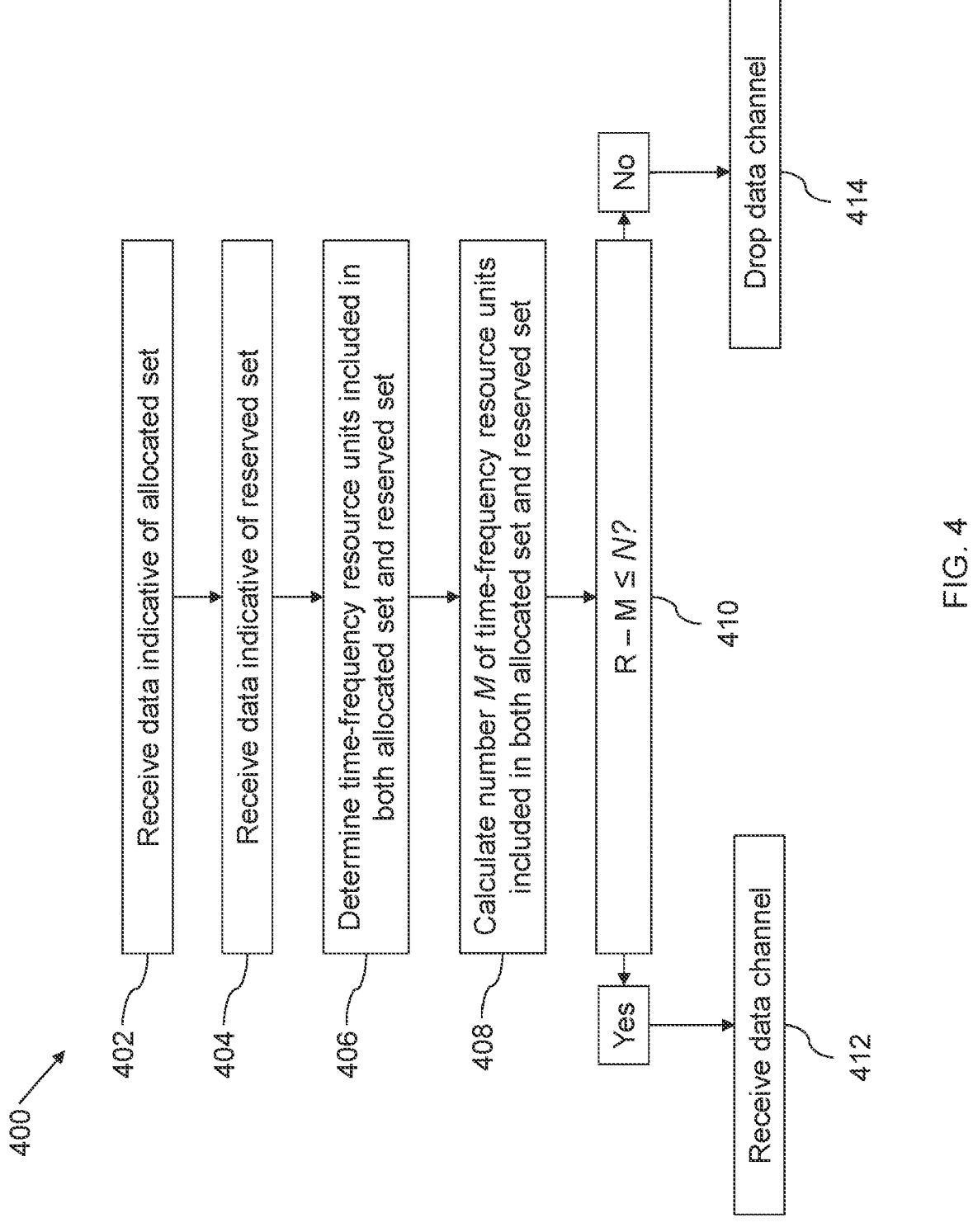
FIG. 4 is a flowchart illustrating a series of operations performed by a receiver in accordance with an embodiment of the present invention.

FIG. 4 is a flowchart 400 showing an example of the operations performed by the first UE 106. Firstly, at step 402, the first UE 106 receives, from the base station 102, data indicative of the allocated set of R time-frequency resource units. At step 404, the first UE 106 receives, from the base station 102, data indicative of the reserved set 212, 312 of time-frequency resource units. At step 406, the first UE 106 determines which time-frequency resource units are included in both the allocated set and the reserved set. At step 408, the first UE 106 calculates the number M of time-frequency resource units included in both the allocated set and the reserved set.

At step 410, the first UE 106 determines whether R−M≤N. The first UE 106 knows N (i.e. the maximum number of time-frequency resource units carrying the data channel that it can receive within a timeslot), as it is stored locally on the first UE 106. If the result is true, then the first UE 106 proceeds to step 412 where the first UE 106 receives the data channel when it is transmitted by the base station 102. If not, the first UE 106 instead proceeds to step 414 where it drops (i.e. does not receive, may send a NACK, etc.) the data channel when it is transmitter by the base station 102. The steps 410, 412 and 414 enable the receiver to check whether it will be able to receive the data channel when it is transmitted by the base station 102 and, if not, respond accordingly before it begins the receiving and processing the data channel, thereby saving its limited computational resources and reducing overall power consumption.

It will be appreciated by those skilled in the art that the invention has been illustrated by describing one or more specific embodiments thereof, but it is not limited to these embodiments; many variations and modifications are possible, within the scope of the appended claims.

The invention claimed is:

1. A radio transmitter configured to operate in accordance with a first predetermined orthogonal frequency-division multiplexing (OFDM) radio protocol, the radio transmitter being configured to:

reserve, within a timeslot with a predetermined timeslot duration, a reserved set of time-frequency resource units not available for an OFDM data channel defined by the first OFDM radio protocol;

allocate, within the timeslot, an allocated set of R time-frequency resource units for the OFDM data channel defined by the first OFDM radio protocol, wherein a number M of time-frequency resource units are included in both the allocated set of R time-frequency resource units for the data channel and the reserved set of time-frequency resource units not available for the data channel, and wherein the value R is such that R>N and R−M≤N, where N is a predetermined maximum number of time-frequency resource units that can be used to carry the data channel within the timeslot; and transmit data indicative of the allocated set of R time-frequency resource units for the data channel and data indicative of the reserved set of time-frequency resource units not available for the data channel.

2. The radio transmitter as claimed in claim 1, further configured to transmit data over the data channel, within the timeslot, over at least a temporal portion of each of the time-frequency resource units that are included in the allocated set of R time-frequency resource units for the data channel and not included in the reserved set of time-frequency resource units not available for the data channel.

3. The radio transmitter as claimed in claim 1, wherein the reserved set of time-frequency resource units not available for the data channel comprises a reserved set of time-frequency resource units for one or more OFDM signals or channels other than the data channel.

4. The radio transmitter as claimed in claim 1, wherein:

the reserved set of time-frequency resource units not available for the data channel comprises a reserved set of time-frequency resource units for one or more signals or channels defined by a second predetermined OFDM radio protocol, different from the first radio protocol; and the transmitter is further configured to operate in accordance with the second OFDM radio protocol.

5. The radio transmitter as claimed in claim 1, wherein each time-frequency resource unit occupies, in frequency, a respective one of a plurality of non-overlapping frequency ranges.

6. The radio transmitter as claimed in claim 1, wherein each time-frequency resource unit has a duration equal to one OFDM symbol period defined by the first protocol.

7. The radio transmitter as claimed in claim 1, wherein each time-frequency resource unit has a duration equal to the predetermined timeslot duration.

8. The radio transmitter as claimed in claim 1, wherein the predetermined maximum number N of time-frequency resource units that can be used to carry the data channel within the timeslot is defined by the first OFDM radio protocol.

9. The radio transmitter as claimed in claim 1, wherein the number M of time-frequency resource units included in both the allocated set of R time-frequency resource units for the data channel and the reserved set of time-frequency resource units not available for the data channel for the timeslot is greater than zero.

10. The radio transmitter as claimed in claim 1, wherein the value R is a maximum value that is divisible by the predetermined timeslot duration, measured in time-frequency resource unit durations, and that satisfies R>N and R−M≤N.

11. A radio receiver configured to operate in accordance with a first predetermined orthogonal frequency-division multiplexing (OFDM) radio protocol, the radio receiver being configured:

within a timeslot with a predetermined timeslot duration, to receive and process up to a predetermined maximum number N of time-frequency resource units carrying an OFDM data channel defined by the first OFDM radio protocol;

to receive data indicative of an allocated set of R time-frequency resource units for said data channel;

to receive data indicative of a reserved set of time-frequency resource units not available for said data channel; and to use said received data to determine which of the time-frequency resource units included in the allocated set of R time-frequency resource units for the data channel are also included in the reserved set of time-frequency resource units not available for the data channel.

12. The radio receiver as claimed in claim 11, configured to receive data over the data channel, within the timeslot, over at least a temporal portion of each of the time-frequency resource units that are included in the allocated set of R time-frequency resource units for the data channel and not included in the reserved set of time-frequency resource units not available for the data channel.

13. The radio receiver as claimed in claim 11, wherein the predetermined maximum number N is defined by the first OFDM radio protocol.

14. The radio receiver as claimed in claim 11, wherein the receiver is configured, within any timeslot defined by the first OFDM radio protocol, having a duration equal to the predetermined timeslot duration, to receive and process up to the predetermined maximum number N of time-frequency resource units carrying an OFDM data channel defined by the first OFDM radio protocol.

15. The radio receiver as claimed in claim 11, configured to calculate a number M of time-frequency resource units included in both the allocated set of R time-frequency resource units for the data channel and the reserved set of time-frequency resource units not available for the data channel.

16. The radio receiver as claimed in claim 15, configured to calculate the number M of time-frequency resource units included in both the allocated set of R time-frequency resource units for the data channel and the reserved set of time-frequency resource units not available for the data channel by determining the number of time-frequency resource units for which the receiver would not need to perform channel estimation and/or demodulation and/or de-mapping and/or channel-code-rate-matching.

17. The radio receiver as claimed in claim 15, configured to:

determine whether $R-M \leq N$; and determine whether to receive and process data transmitted over the data channel within the timeslot in dependence on whether $R-M \leq N$.

18. The radio receiver as claimed in claim 17, configured to:

drop data transmitted over the data channel within the timeslot when $R-M > N$; and receive the data channel within the timeslot when $R-M \leq M$.

19. An orthogonal frequency-division multiplexing (OFDM) radio communication system comprising a radio transmitter and a radio receiver, the transmitter and receiver being configured to operate in accordance with a first predetermined OFDM radio protocol, wherein:

the receiver is configured, within a timeslot with a predetermined timeslot duration, to receive and process up to a predetermined maximum number N of time-frequency resource units carrying an OFDM data channel defined by the first OFDM radio protocol; and the transmitter is configured to:

reserve, within the timeslot, a reserved set of time-frequency resource units not available for the data channel;

allocate, within the timeslot, an allocated set of R time-frequency resource units for the data channel, wherein a number M of time-frequency resource units are included in both the allocated set of R time-frequency resource units for the data channel and the reserved set of time-frequency resource units not available for the data channel, and wherein the value R is such that $R > N$ and $R-M \leq N$; and transmit, to the receiver, data indicative of the allocated set of R time-frequency resource units for the data channel and data indicative of the reserved set of time-frequency resource units not available for the data channel.

20. The radio communication system as claimed in claim 19, wherein:

the receiver is configured, within any timeslot defined by the first protocol, with the predetermined timeslot duration, to receive and process up to the predetermined maximum number N of time-frequency resource units carrying an OFDM data channel defined by the first OFDM radio protocol; and the transmitter is configured to allocate, within any timeslot defined by the first OFDM radio protocol, with the predetermined timeslot duration, an allocated set of R time-frequency resource units for a data channel defined by the first protocol and intended for data transmission to the receiver.

* * * * *